(12) United States Patent
Stewart et al.

(10) Patent No.: US 9,439,164 B2
(45) Date of Patent: Sep. 6, 2016

(54) LUGGAGE TRACKING METHOD AND APPARATUS

(71) Applicants: Robert John Stewart, Soquel, CA (US); Charbel Abi Antoun, Beirut (LB); William Naim, Los Angeles, CA (US); Rabih Aridi, Los Angeles, CA (US); Harry Steck, Woodland Hills, CA (US); Joseph LaMance Morgan, Atlanta, GA (US)

(72) Inventors: Robert John Stewart, Soquel, CA (US); Charbel Abi Antoun, Beirut (LB); William Naim, Los Angeles, CA (US); Rabih Aridi, Los Angeles, CA (US); Harry Steck, Woodland Hills, CA (US); Joseph LaMance Morgan, Atlanta, GA (US)

(*) Notice: Subject to any disclaimer, the term of this patent is extended or adjusted under 35 U.S.C. 154(b) by 0 days.

(21) Appl. No.: 14/227,140

(22) Filed: Mar. 27, 2014

(65) Prior Publication Data

US 2015/0195804 A1 Jul. 9, 2015

Related U.S. Application Data

(60) Provisional application No. 61/964,533, filed on Jan. 9, 2014.

(51) Int. Cl.
| | | |
|---|---|---|
| *H04W 4/00* | (2009.01) | |
| *H04W 64/00* | (2009.01) | |
| *H04W 8/10* | (2009.01) | |
| *H04L 29/08* | (2006.01) | |
| *H04W 4/02* | (2009.01) | |
| *H04W 4/14* | (2009.01) | |

(52) U.S. Cl.
CPC .............. *H04W 64/00* (2013.01); *H04L 67/26* (2013.01); *H04W 4/00* (2013.01); *H04W 4/028* (2013.01); *H04W 4/14* (2013.01); *H04W 8/10* (2013.01)

(58) Field of Classification Search
CPC .......... H04W 8/12; H04W 8/04; H04W 8/06
USPC ............ 455/433, 418, 420, 421, 423, 414.1, 455/404.2, 456.1
See application file for complete search history.

(56) References Cited

U.S. PATENT DOCUMENTS

| | | | |
|---|---|---|---|
| 5,485,163 A * | 1/1996 | Singer et al. ................. | 342/457 |
| 5,490,201 A | 2/1996 | Moberg et al. | |
| 5,953,662 A | 9/1999 | Lindquist et al. | |
| 7,801,512 B1 | 9/2010 | Myr | |
| 8,644,794 B1 * | 2/2014 | Sites .......................... | 455/404.2 |
| 2003/0040323 A1 | 2/2003 | Pihl et al. | |
| 2005/0271021 A1 * | 12/2005 | Alemany et al. ............. | 370/338 |
| 2006/0240860 A1 * | 10/2006 | Benco et al. ............... | 455/550.1 |
| 2008/0248808 A1 * | 10/2008 | Alizadeh-Shabdiz | H04W 64/006 455/456.1 |
| 2009/0315704 A1 | 12/2009 | Rosing et al. | |
| 2010/0317372 A1 * | 12/2010 | Wigren et al. ............. | 455/456.6 |
| 2013/0249673 A1 | 9/2013 | Ferrari | |

* cited by examiner

*Primary Examiner* — Nghi H Ly
(74) *Attorney, Agent, or Firm* — C. John Brannon; Brannon Sowers & Cracraft PC

(57) ABSTRACT

The claimed technology provides a new method and process for locating and sharing information regarding the location of checked-in luggage while traveling. As part of the claimed technology, a GSM device is placed into luggage to be checked in by the traveler at the airline counter. A mobile device such as a phone or tablet lets the traveler know that their luggage has arrived in sync with the air flight. If the luggage has not arrived, the claimed technology notifies both traveler and airline of the airport location of the luggage, and proactively triggers the airline to coordinate with the passenger for delivery of the luggage.

10 Claims, 2 Drawing Sheets

LUGGAGE TRACKING METHOD AND APPARATUS

CROSS REFERENCE TO RELATED APPLICATIONS

This application is related to and claims priority to U.S. Provisional Patent No. 61/964,533 filed on Jan. 9, 2014.

BACKGROUND

Statistics show that 993 of every 1000 pieces of luggage that are checked in by the traveler for airline flight handling do arrive with the traveler at the flight destination. Given the volume of luggage on flights worldwide, those seven lost pieces equate to roughly 30 million pieces of luggage each year that are miss-placed by the airlines. Of the seven lost pieces of luggage, five are found and returned by the airline to the traveler on average within 72 hours, but two remain lost.

During the check-in process, luggage is tagged and banded on the outside by the airline with a special QR code (Quick Response Code) and flight and traveler identification. Sometimes the tags are ripped off or damaged during the loading and unloading process. Sometimes luggage misses a flight or is loaded onto a different airplane and ends up in a different destination airport. Sometimes luggage is miss-handled at an intermediate airport, where the traveler disembarks one flight and continues on another. Coordination between the traveler and the airline for notification and return of lost luggage can be very time-consuming, difficult and stressful. The entire process for the airline relating to tracking luggage, returning lost luggage, and compensating the traveler is extraordinarily expensive. Lost luggage related expense is reported by airlines to cost the industry over $3.5 billion each year.

With the advent of satellite technology, it has become possible for devices such as mobile phones to achieve precise navigation location awareness under certain circumstances using a technique called GPS (Global Positioning System). However, at least 4 issues prevent GPS from being used effectively for tracking airline luggage:

1. In the United States, the FCC has directed the FAA to require of all airlines that certain electronic devices, including mobile phones with or without GPS enablement, remain disabled and in an "off" status during air flight. Such direction is apparently necessary due to possible radio frequency interference with airline industry frequencies used by the airlines and traffic control tower personnel. The US prohibition of activation and use of certain electronic devices during air flight is followed almost universally by other airlines worldwide.
2. Most GPS devices require at least indirect line-of-sight with the sky and satellite in order to function. As such, GPS typically works poorly if at all inside airports.
3. GPS enabled devices are expensive for the traveler to place inside every piece of luggage.
4. Any information concerning luggage location by a traveler's GPS device would have to be shared with the airline to be of any use in recovering the luggage.

Not to be confused with GPS, GSM (Global System for Mobile Communication) is defined as a cellular network, which means that cell phones connect to it by searching for terrestrial cell towers in the immediate vicinity. GSM was developed by ETSI (European Telecommunication Standards Institute) as an international standard. GSM includes GPRS (General Packet Radio Service) for circuit switched data transport of packets.

An SMLC (serving mobile location center) is a network element in GSM cellular networks that resides in the BSC (Base Station Controller) of a Mobile Switching Center. A purpose of an SMLC is to calculate the network-based location of mobile phones. An SMLC may control several LMUs (Location Measurement Units) which are housed on towers and which measure radio signals to help find mobile phones in the area served by the SMLC. It can calculate location using the TA (Timing Advance) method.

Radio resource location services (LCS) protocol (RRLP) applies to GSM cellular networks. The RRLP protocol is used to exchange messages between a mobile phone and an SMLC in order to provide geo-location information, for example, in the case of emergency calls. The protocol was developed to fulfill the Wireless Enhanced 911 requirements in the United States. However, since the protocol does not require any authentication and can be used outside a voice call or SMS transfer, its use is not restricted to emergency calls. For example, it can be used by law enforcement to pinpoint the exact geo-location of any mobile phone.

RRLP supports positioning methods for mobile phones enabled with GPS as well as for mobile phones without GPS. For non-GPS mobile phones, RRLP performs an Enhanced Observed Time Difference (E-OTD) function, which is based on measurements inside the mobile phone, where the phone measures the observed time difference of arrival of bursts of signaling (SS-7) sent by nearby pairs of base transceiver stations.

Cellular network towers have GPS receivers (or a base station nearby) and those receivers are constantly pulling down satellite information and computing the data. This data is then passed on to the cellular phone whether the phone is GPS enabled or not (when requested by the phone via SS-7 signaling). The RRLP information gathering method is ideal for tracking the location of a multitude of applications where the pinpointing does not have to be exact, and where the device is not GPS enabled.

DESCRIPTION

Figure 1:
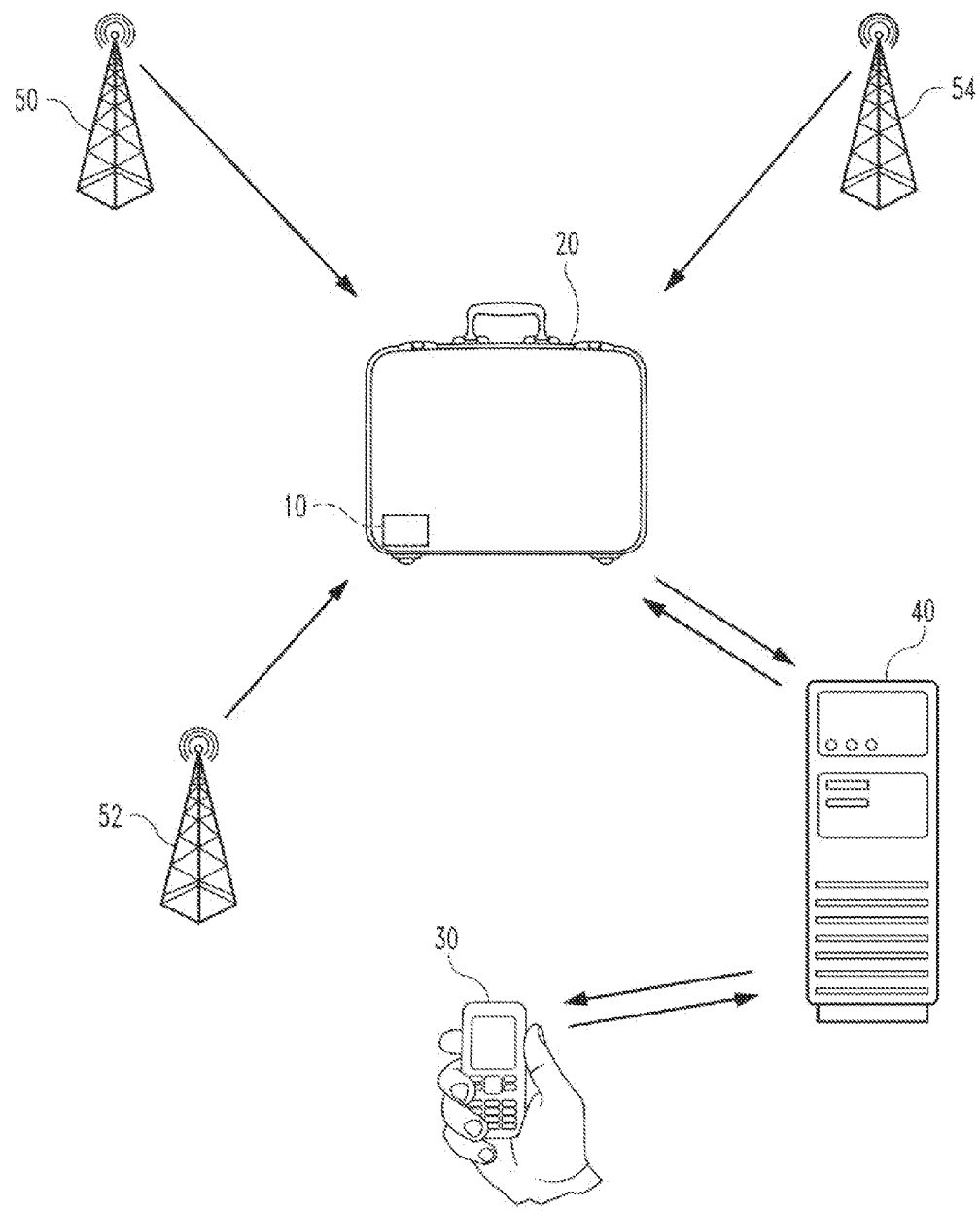
FIG. 1 is a block diagram of a tracking system according to one embodiment of the claimed invention.
Figure 2:
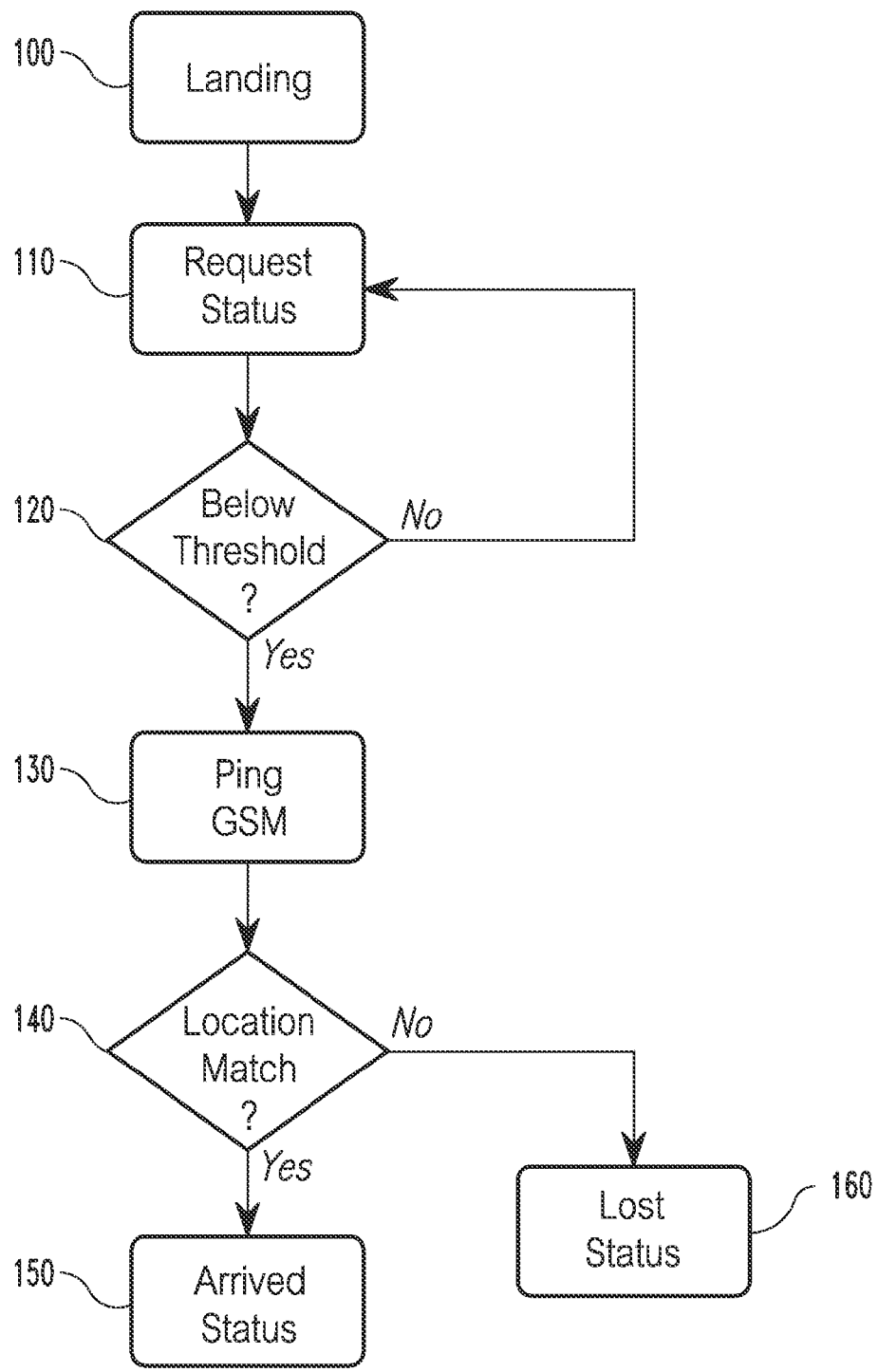
FIG. 2 is a block diagram of a tracking system according to another embodiment of the claimed invention.

For the purposes of promoting an understanding of the principles of the claimed technology and presenting its currently understood best mode of operation, reference will now be made to the embodiments illustrated in the drawings and specific language will be used to describe the same. It will nevertheless be understood that no limitation of the scope of the claimed technology is thereby intended, with such alterations and further modifications in the illustrated device and such further applications of the principles of the claimed technology as illustrated therein being contemplated as would normally occur to one skilled in the art to which the claimed technology relates.

The claimed technology provides a new method and device for locating and sharing information regarding the location of checked-in luggage while traveling. Whereas prior art for luggage awareness attempts to use luggage tags and scanning devices or GPS technology, the claimed technology uses neither. Whereas prior art may deliver tools for the airline industry to track luggage that has been reported by the passenger to have been lost, certain embodiments of the claimed technology specifically addresses the passenger need to be notified in real-time upon destination arrival, including at mid-point transfer or intermediate airports, that their checked-in luggage has arrived. In some embodiments the claimed technology is proactive in information sharing so that the passenger (and the airline) knows luggage status immediate upon airplane landing and while taxiing in preparation for disembarking. In other embodiments, the claimed technology may have global application. In still other embodiments, the claimed technology resolves battery life issues through programmed instructions hosted at an HLR platform 40 (Home Location Register) without traveler intervention.

One element of the claimed technology, a Luggage Locator Device 10, is placed into luggage 20 to be checked in by the traveler at the airline counter. The locator device may be packed in the luggage to be tracked as would a normal item, attached to the exterior of the luggage as part of a name or identification tag, or optionally incorporated directly into the luggage as desired. The claimed technology lets the traveler know that their luggage has arrived in sync with the air flight. If the luggage has not arrived, the claimed technology optionally notifies both traveler and airline of the airport location of the luggage, and proactively triggers the airline to coordinate with the passenger for delivery of the luggage. While in flight the claimed technology places the Luggage Locator Device within the luggage in an "off" or "sleep mode" condition so that it is not emitting any RF (radio frequency). Placing the claimed technology in an off state while in flight insures that the device complies with all relevant FCC and FAA regulations.

Once the traveler has landed and is at the airport carousel to retrieve his luggage, the Luggage Locator Device in collaboration with a mobile device application and Bluetooth or similar short range RF system informs the traveler of the location of the device and luggage and of any ongoing movement of the luggage relative to the mobile device 30. This particular aspect of the claimed technology aids the traveler in more rapid and assured luggage identity, and can deter luggage loss or theft.

In one embodiment of the claimed technology the components include: 1) a GSM device 10 to be placed inside luggage 20 by a traveler before handing the luggage to the airline at check-in during the pre-boarding process; 2) a mobile device 30 such as a mobile phone or tablet capable of receiving Internet application (API client) downloads and SMS text messages (and optionally having the ability to operate in multiple countries in the case of international travel); 3) an application downloaded onto the mobile device 30; and 4) a host platform 40 telecommunicating both with the GSM device and the mobile device.

Another embodiment of the claimed technology enables an application suitable for operation on other mobile devices, not just "smart" mobile phones which are able to receive Internet downloads. Such other mobile devices include, but are not limited to, tablets, personal digital assistants (PDA), laptops, and the like. In another embodiment, any device capable of sending and receiving information with a host platform may be used.

The claimed technology resolves several airline industry and airline passenger issues regarding locating luggage, including:

Electronic devices of passengers, including mobile phones, if "on" during air flight are in violation of FCC and FAA regulations because they are emitting RF.

When the luggage tag attached to the checked-in luggage by the airline becomes damaged or torn off, the airline (and the traveler) loses ability to track luggage.

Devices using GPS for location awareness may not work without line of sight to the sky such as inside airports or other structures.

Devices used for location awareness when "on" consume battery power and need to be recharged frequently.

Devices using GPS are expensive.

Location awareness devices on the market today do not address the need for travelers to know in real time that their luggage is at the same airport with them; instead of addressing "traveler stress," devices today are sold to the traveler but deliver a tool targeted to the airline.

Airlines and their crew are unable to control the unauthorized, perhaps secretive, use of a mobile device by a passenger during flight, especially at elevations less than 10K feet where the ability for the device to lock-in on a landline cell tower for RF transmission is more technically possible.

Luggage at the airport can all look the same. Travelers seeking retrieval of their luggage at the airport carousel sometimes mistake someone else's luggage for their own and depart with it, and/or can have time-consuming and frustrating difficulty in locating their luggage even though it is in the carousel area.

In one embodiment of the claimed technology, RF chip firmware in a luggage locator device provides a mathematical formula for ascertaining cell site locations 50, 52, 54 (e.g.—device communicates with different cell sites, and the changes in the round trip time from the device to the cell sites are measured). The speed of the movement of the device is calculated, which triggers an HLR-based decision tree. In one example, the device stays off unless the speed of movement is measured to be less than 200 mph. Such might be the desired threshold speed of travel of luggage located in an airplane as it departs or lands on the runway. In other examples, the speed threshold may be higher or lower as desired. In this way, the luggage locator device would be enabled and controlled to only be operable if the speed of its movement is less than a predetermined threshold speed such as may be the speed on a tarmac once landed and when taxiing.

In another embodiment of the claimed technology, an accelerometer sensor measures the "g-force," as a vector acceleration produced by the mechanical force, such as of the movement of the airplane, as opposed to a gravitational force. Such a g-force measurement threshold can be set so that the device can be automatically activated or de-activated in terms of RF signaling enablement. The desired threshold would be set as a rule-set in the HRL-based decision tree, so that if the g-force equivalent, for example of 200 mph was reached, the device would be triggered to be in the off or sleep mode condition. Conversely, upon detecting a second g-force equivalent of deceleration upon landing the device would reactivate.

Also as part of the claimed technology, additional RF chip firmware in a luggage locater emits very low bandwidth RF signal (such as Bluetooth or other suitable signal) upon traveler prompt (e.g.—via traveler enabled mobile device application). In one embodiment, the mobile device visually shows a "thermometer," which gets "hotter" as the Luggage Locater Device approaches the traveler's mobile device, and "colder" as the Locator Device moves away. In other embodiments other visual and/or aural indicators may be used.

In one embodiment, physical hardware and software components of the claimed technology includes: 1) a GSM device to be placed inside luggage by an traveler before handing the luggage to the airline at check-in during the boarding process; 2) a mobile device carried by the traveler, the device being able to receive Internet application (API client) downloads and SMS text messages, and optionally being capable of operating in more than one country (if desired); 3) an application downloaded onto the mobile device; and 4) a host HLR (Home Location Register) platform communicating with the GSM device, with the traveler, and optionally with third parties.

A further description of one example embodiment of each of these hardware and software components is as follows:

GSM Device—A wireless device assigned with a unique registration identity that meets Global System for Mobile Communications international standards and includes a unified range of frequencies so that it can be used across a range of cellular carrier networks for roaming communication with its Home Location Register (HLR) worldwide. The device is not intended for the purposes of the claimed invention to include voice or data communications (although in other embodiments such capabilities may be included). Instead, the device is to be used at a remote location, such as within luggage, solely for response driven automated signaling channel communications with a host HLR.

Mobile Device—Any standard mobile phone that meets Global System for Mobile Communications international standards and includes a unified range of frequencies so that it can be used across a range of cellular carrier networks for roaming communication with its Home Location Register (HLR) worldwide. The device must be able to accept and download an API/client application via Internet means, and to be able to send and receive SMS signaling. In other embodiments, the device is a pad, tablet, laptop, or other suitable mobile device capable of receiving (via the Internet, disk, USB device, or other suitable means) and running a client application, and able to receive communications such as SMS text, email, audio, or other suitable means.

Mobile Device Application—An application for download onto a Mobile Device by the user. The application optionally establishes an icon for use when the phone is "on." Clicking the icon triggers the Host HLR Platform to query or "ping" the GSM Device via a Forward Control Channel (FOCC). The "ping" triggers the GSM Device to acknowledge respond via a Reverse Control Channel (RECC).

Host HLR Platform—A standard Home Location Register enabled with custom platform advanced functionality including data base look-up intelligence uniquely provided. Included in the functionality is to instruct a "pinged" GSM Device to respond via signaling channel over an RECC such that the response is not treated as Short Message Signaling (SMS) for gateway at the Mobile Switching Center (MSC) to the SMSC, but rather is directed at the MSC to the SS-7 Link for direct non-switch channeling to the HLR.

All GSM wireless devices are enabled with 3 types of channels—voice, data, and signaling—each with their own unique purpose and transmission protocol requirements. In one embodiment, the claimed technology uses the short, bursty rule-set event driven and occasional (asynchronous) transmission of common channel signaling (CCS, SS-7), the transmission path of the wireless voice and data channels are "always on," synchronous, and route and traverse through gateways and the switching infrastructure of the local and long distance carriers. One example is SMS messaging, which routes through an SMSC Gateway for queuing and switching.

The SS7 transmission path as used by the claimed technology and also by all global GSM network service providers for wireless call setup purposes, is asynchronous, activated for signaling for our purposes by a rule-set in the HLR cloud platform, and includes that the signaling path route via an "SS7 Link,"—through providers such as Syniverse or TNSI—for Non-Call-Associated Signaling. Such use is for singular packet signaling that is not directly related to the establishment of a mobile call. An example of this is the exchange of the registration information used between a mobile telephone and an HLR database, which is a database of the home carrier of the subscriber that tracks the location of the mobile device. In this manner the home carrier knows where their subscriber is when their mobile device is "on," but prior to the subscriber attempting to establish a voice or data channel connection. This wireless SS7 path does not route through an SMSC gateway, there is no queuing, and there is no switching. The ITU requires that the Non-Call-Associated Signaling (SS7) round trip between the mobile device, home carrier, and visited carrier occurs in less than 200 milliseconds. The transmission is then completed and there is no continuous channel transmission functionality.

One embodiment of the claimed technology describes a method and system that includes a signaling channel which is absolutely not useful and not purposeful for controlling access to components, but instead is solely useful to secure access for a transmitting a singular packet of information regarding an event, such as landing at an airport for transmission of time and location. The event awareness information—such as location of luggage—is established by a rule-set database in the HRL "cloud" Platform. Network components and network functions associated with this particular embodiment of the claimed technology include the following:

GSM cellular systems include signaling control channels for communicating call set-up between base stations, mobile devices, and mobile operators. The control channel system includes a Forward Control Channel (FOCC) and a Reverse Control Channel (RECC). The cellular base station uses the FOCC to send information to mobile devices and the mobile devices send information back to the cellular base station via RECC. The FOCC and the RECC are used to establish a wireless call through a local switch. The cell base station broadcasts a System Identification ("SID") signal which identifies the cellular system to the mobile phone receiving it. The identity of the mobile device enables its physical location to be known. When a cell phone is turned on, the phone compares the SID signal it receives against a SID stored within the cell phone. The SID stored within the cell phone is the device's home mobile operator identity. If the SID's do not match, the phone is "roaming" and a roam indicator is immediately shown on the mobile device. Again, this all takes place as soon as the wireless device is turned on by the user.

Subsequently, the wireless device transmits its identity to the cell base station via the RECC. The RECC signal includes the Mobile Identification Number (MIN). This is a unique phone number including the area code. Using the MIN, the base station determines the home mobile operator and sends a validation signal to that system. The validation signal includes the identity of the base station sending the message. This is called a Registration Notification Invoke (REGNOT) message.

A Mobile Station Roaming Number (MSRN) is an international wireless industry standards defined telephone number used to route telephone calls in a mobile network from a Gateway MSC (Mobile Switching Center) to the target MSC. It can also be defined as a directory number temporarily assigned to a mobile phone for a mobile terminated call. An MSRN is assigned for every mobile terminated call, worldwide. The MSRN is one of the returned parameters to an HLR in what is called an SRI Response. The VLR generates the MSRN on request from the MSC, and the MSRN is sent by signaling channel and stored in the HLR. The MSRN contains the current visitor country code (VCC), the visitor national destination code (VNDC), the identification of the MSC servicing the mobile phone (while roaming), and the subscriber number.

In one embodiment, the location awareness call flow process of the claimed technology once bounded by the claimed technology's enablement of HLR remote control of its operational functionality based on speed of movement may include as follows. Other embodiments of the claimed technology may include more or fewer steps.

1) Traveler lands at destination airport and activates their mobile phone 100.
2) Activation of mobile phone establishes a common channel signaling ("SS7") channel message to the Host HLR Platform, notifying of the MIN identity and SID cell tower identity of the traveler, as well as the MSRN.
3) Traveler clicks "Luggage" icon on mobile phone 110.
4) Clicking of icon establishes signaling channel SMS-type message to HLR, requesting Host HLR Platform to "ping" the GSM Device if the device is moving at a speed below a pre-determined threshold 120.
5) GSM Device respond to ping by activating from "off" mode," and is recognized by the local cell tower and MSC which it locks to 130.
6) The MSC requests the VLR to generate an MSRN, which is forwarded by signaling channel to the Host HLR Platform.
7) Host HLR Platform compares the SID and/or MSRN of the Mobile Phone with the SID/MSRN of the GSM Device 140, and then associates the information (i.e., the country code, area code, and serving MSC identity) with a corresponding airport identity via Platform database look-up. If they match, the HLR sends an SMS to the Mobile Phone notifying that the luggage has arrived at the destination airport with the traveler 150. If no match, HLR sends SMS to the Mobile Phone notifying of airport where luggage is at. Concurrently, HLR is able to send a similar message to the airline industry notifying of "lost" luggage plus the identity of traveler and locations (including city and airport) of traveler and said luggage 160.
8) Host HLR Platform pings GSM Device instructing to de-activate, thereby reserving battery.

In certain embodiments, the claimed technology's use of the international standardized signaling channel to communicate between the HLR, VLR, MSC, and GSM Device inherently establishes real-time information sharing, as the global round trip delay of a wireless signaling channel (SS-7) per international standards requirement is <200 milliseconds (speed of light). Only one packet of information sharing per signaling transmission is required, although more packets may be shared. The location awareness communication method solely relies on use of an SS-7 signaling channel, and no voice or data PSTN network transmission is required to be shared.

In one embodiment, the claimed technology's method also establishes that the Mobile Device as well as the Luggage Locator Device is only activated by the airline passenger once the airplane lands, and only then does each such device get activated by the Host HLR Platform. Similarly and additionally, the Host HLR Platform may be able to deactivate such Luggage Locator Device while said device is in flight.

In another embodiment, the claimed technology uses the RRLP function of the mobile device, whether Mobile Phone or Luggage Locator Device, for said device to obtain E-OTD information regarding the difference of arrival of signaling sent by nearby base transceiver stations. As part of the claimed technology, a mathematical algorithm calculates present, subsequent, and previously gathered similar E-OTD (observed time difference) information in a way that speed of movement of said device(s) is determined. This information is passed ongoing using signaling by said device(s) to the Host HLR Platform. The Host HLR Platform is programmed to activate or deactivate the device(s) (and/or its assigned mate as one embodiment) based on predetermined speed thresholds.

In one embodiment, the cloud platform as application host may include a database with a rule-set table that establishes a relationship between the luggage being tracked and variables to be tracked. The rule-set may be security code accessed so that the person who wishes their luggage to be tracked may customize certain parameters. Note that other luggage may be tied by the same rule-set table to a separate application and user, and so on, so that multiple clients and separate applications may be operationally supported by the same method and system.

In another embodiment, rather than functioning as sole application host, the network-based platform may be used for tying and directing communications as appropriate, where the client elects to establish its own separate or partitioned platform for proprietary rule-set establishment, maintenance, and edit purposes. In such case, a TCP/IP connection would occur between the network platform and the customer's network interface. This may be appropriate, for example, so that an airline can develop its own unique and branded luggage tracking product and service for its own clients.

Consider an application that applies to an airline with luggage tracking oversight on multiple airplanes and multiple airports. An airline control center enables centralized computer monitoring of each of the airports and airplanes, such that the control center has real-time knowledge of the location of each piece of luggage to be tracked. In such example, there may be multiple computer monitor screens in the control center and/or the ability to scroll, select and view any of optional sites from one monitor. Monitoring would not be video camera, but rather via a map overlay for pinpointed determination of the location of each piece of luggage based on the embedded device placed within the luggage.

Control center functionality may also include accessing database stored historical data captured by the rule-set parameters and useful for real-time decision-making. In an embodiment, the control center computer screen monitor may be extended to include a smart mobile device screen, such that the control center functionality can be mobile.

Anyone familiar with the art will be aware that the claimed technology has pragmatic applications well beyond the luggage location awareness use as described herein. For example, a homeland security application where it may be useful to monitor and/or control remote wireless phones and similar devices based on their movement and/or speed of movement. As such, the claimed technology is broad in scope and covers any and all additional marketplace location awareness applications, past, present and future whose technology is based on the technology, methods, and systems encompassing this Invention.

While the claimed technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the claimed technology are desired to be protected.

What is claimed is:

1. A system for determining the location of a piece of luggage, comprising:
   providing a GSM (Global System for Mobile Communications) device attached to the luggage to be tracked;
   providing a mobile device to be carried by a user;
   providing a host HLR (Home Location Register) platform having programmable rule-set database parameters including rule-set driven pro-active data gathering, analysis, and historical data analytics store-and-forward purposes;
   wherein the mobile device is capable of communicating with the HLR platform and requesting the HLR platform query the GSM device;
   wherein the HLR platform is able to determine the location of the GSM device and the mobile device;
   wherein the HLR platform is able to activate and deactivate the GSM device using the database parameters;
   wherein the HLR platform disables the GSM device if the GSM device is traveling above a predetermined speed calculated by comparing changes in the time it takes a signal to travel from one or more cell sites to the GSM device.

2. The system of claim 1, wherein the mobile device is a cellular telephone unit.

3. The system of claim 1, wherein the HLR platform enables the GSM device if the GSM device is traveling below a predetermined speed calculated by comparing changes in the time it takes a signal to travel from one or more cell sites to the GSM device.

4. The system of claim 1, wherein the HLR platform determines the location of the GSM device using RRLP (Radio Resource Location Services Protocol) function of the GSM device to obtain E-OTD (Enhanced Observed Time Difference) information.

5. The system of claim 1, wherein the HLR platform determines the speed of the GSM device using RRLP (Radio Resource Location Services Protocol) function of the GSM device to obtain E-OTD (Enhanced Observed Time Difference) information.

6. The system of claim 1, wherein the GSM device lacks the ability to send or receive voice communications and lacks the ability to send or receive data communications.

7. The system of claim 1, further comprising:
   providing a second GSM device attached to a second piece of luggage to be tracked;
   wherein the HLR platform is able to determine the location of the second GSM device;
   wherein the HLR platform is able to activate and deactivate the second GSM device using the database parameters.

8. A kit for determining the location of a piece of luggage, comprising:
   a GSM (Global System for Mobile Communications) device attachable to the luggage to be tracked; a software application usable by a mobile device carried by a user;
   wherein the software application is capable of communicating with a host HLR (Home Location Register) platform having programmable rule-set database parameters including rule-set driven pro-active data gathering, analysis, and historical data analytics store-and-forward purposes;
   wherein the software application is capable of requesting the HLR platform query the GSM device;
   wherein the HLR platform is able to determine the location of the GSM device and the mobile device;
   wherein the HLR platform is able to activate and deactivate the GSM device using the database parameters;
   wherein the HLR platform disables the GSM device if the GSM device is traveling above a predetermined speed and enables the GSM device if the GSM device is traveling below a predetermined speed, wherein the speed is determined by comparing changes in the time it takes a signal to travel from one or more cell sites to the GSM device.

9. The kit of claim 8, wherein the HLR platform determines the location of the GSM device using RRLP (Radio Resource Location Services Protocol) function of the GSM device to obtain E-OTD (Enhanced Observed Time Difference) information.

10. The kit of claim 8, wherein the GSM device lacks the ability to send or receive voice communications and lacks the ability to send or receive data communications.

* * * * *